(12) United States Patent
Gordon et al.

(10) Patent No.: US 8,380,791 B1
(45) Date of Patent: Feb. 19, 2013

(54) ANTI-SPAM SYSTEM, METHOD, AND COMPUTER PROGRAM PRODUCT

(75) Inventors: Bryson P. Gordon, Campbell, CA (US); Thor Ivar Ekle, San Francisco, CA (US)

(73) Assignee: McAfee, Inc., Santa Clara, CA (US)

( * ) Notice: Subject to any disclaimer, the term of this patent is extended or adjusted under 35 U.S.C. 154(b) by 2511 days.

(21) Appl. No.: 10/318,620

(22) Filed: Dec. 13, 2002

(51) Int. Cl.
*G06F 15/16* (2006.01)

(52) U.S. Cl. ........................................................ 709/206

(58) Field of Classification Search .................. 709/206, 709/217; 790/206, 217
See application file for complete search history.

(56) References Cited

U.S. PATENT DOCUMENTS

| | | | |
|---|---|---|---|
| 6,161,130 A | 12/2000 | Horvitz et al. | |
| 6,650,890 B1 | 11/2003 | Irlam et al. | 455/412.1 |
| 6,654,787 B1 * | 11/2003 | Aronson et al. | 709/206 |
| 6,732,157 B1 * | 5/2004 | Gordon et al. | 709/206 |
| 6,941,467 B2 * | 9/2005 | Judge et al. | 726/22 |
| 6,988,143 B2 * | 1/2006 | O'Neill et al. | 709/230 |
| 7,006,993 B1 * | 2/2006 | Cheong et al. | 705/38 |
| 2002/0035566 A1 * | 3/2002 | Rugg et al. | 707/100 |
| 2002/0073337 A1 * | 6/2002 | Ioele et al. | 713/201 |
| 2002/0091772 A1 * | 7/2002 | Yong | 709/206 |
| 2003/0158905 A1 | 8/2003 | Petry et al. | 709/206 |
| 2003/0177188 A1 * | 9/2003 | Brubacher et al. | 709/206 |
| 2004/0117450 A1 * | 6/2004 | Campbell et al. | 709/207 |

* cited by examiner

*Primary Examiner* — Scott Christensen
(74) *Attorney, Agent, or Firm* — Wong, Cabello, Lutsch, Rutherford & Brucculeri, LLP

(57) ABSTRACT

A system, method and computer program product are provided for filtering unwanted electronic mail messages. Included is a first portion capable of downloading electronic mail messages to a computer via a network using a first address. Such first portion is further capable of filtering the electronic mail messages that are unwanted. Further provided is a second portion capable of delivering the filtered electronic mail messages from the first portion to an electronic mail message manager using a second address. The first portion and the second portion reside on the computer.

12 Claims, 10 Drawing Sheets

ANTI-SPAM SYSTEM, METHOD, AND COMPUTER PROGRAM PRODUCT

FIELD OF THE INVENTION

The present invention relates to filtering, and more particularly to filtering unwanted electronic mail messages.

BACKGROUND OF THE INVENTION

The Internet is growing in popularity, and more and more people are conducting business over the Internet, advertising their products and services by generating and sending electronic mass mailings. This electronic mail (e-mail) is usually unsolicited and regarded as nuisances by the recipients because they occupy much of the storage space needed for the necessary and important data processing.

For example, a mail server may have to reject accepting an important and/or desired e-mail when its storage capacity is filled to the maximum with the unwanted e-mail containing advertisements. Moreover, thin client systems such as set top boxes, PDA's, network computers, and pagers all have limited storage capacity. Unwanted mail in any one of such systems can tie up a finite resource for the user. In addition, a typical user wastes time by downloading voluminous but useless advertisement information. Unwanted mail typically slows down users by forcing the mail to be downloaded when the mail is delivered. Because this type of mail is so undesirable, it has acquired a special name in the Internet community, spam.

Prior art FIG. 1 illustrates a prior art anti-spam system 10 capable of filtering spam, in accordance with the prior art. As shown, a computer 16 is equipped with two separate applications, an e-mail manager 14 and an anti-spam application 12. Such e-mail manager 14 may include Microsoft® Outlook®, Outlook Express®, or any other desired product. In use, such e-mail manager 14 is adapted to query an Internet Service Provider (ISP) 20 via a network for downloading electronic mail messages.

Working in parallel with the e-mail manager 14 is the anti-spam application 12, which also queries the ISP 20. In use, the anti-spam application 12 is capable of filtering the electronic mail messages downloaded by the e-mail manager 14.

As shown, the anti-spam application 12 works in parallel with the e-mail manager 14. In other words, the anti-spam application 12 queries the ISP 20 at periodic intervals for filtering purposes independently with respect to the queries of the e-mail manager 14. Ideally, the anti-spam application 12 performs its duties prior to the electronic mail messages being downloaded by the e-mail manager 14.

Unfortunately, however, due to the inherent deficiencies with the foregoing architecture, the e-mail manager 14, at the control of the user, may download electronic mail messages from the ISP 20 before the anti-spam application 12 performs the filtering operation, thus resulting in the display of a spam message to the user. These and other deficiencies associated with the above "competing access" architecture are indicative of a need for a more effective anti-spam system architecture and associated method.

DISCLOSURE OF THE INVENTION

A system, method and computer program product are provided for filtering unwanted electronic mail messages. Included is a first portion capable of downloading electronic mail messages to a computer via a network using a first address. Such first portion is further capable of filtering the electronic mail messages that are unwanted. Further provided is a second portion capable of delivering the filtered electronic mail messages from the first portion to an electronic mail message manager using a second address. In one embodiment, the first portion and the second portion reside on the computer.

In one embodiment, the first portion may include a back-end portion, and the second portion may include a front-end portion. As an option, the first portion may be capable of downloading the electronic mail messages from an Internet Service Provider (ISP).

In another embodiment, the first portion may include an account list including a plurality of the first addresses for downloading the electronic mail messages. As an option, the account list may be capable of being user-configured. Specifically, the account list may be capable of being user-configured by synchronizing the first portion with the second portion, where the second portion provides the user with access to the configurability.

In still another embodiment, the first portion may be capable of filtering the electronic mail messages that are unwanted utilizing a filter engine. Optionally, the filter engine may be capable of being updated via the network. Moreover, the filter engine may be capable of being user-configured. Still yet, the filter engine may be capable of being user-configured by synchronizing the first portion with the second portion. Again, the second portion may provide the user with access to the configurability.

As a further option, the filter engine may be capable of applying a plurality of global filters and a plurality of user-specific filters during the filtering process. The user-specific filters may include white lists. Similar to before, the global filters and the user-specific filters may be configured with the second portion.

In still yet another embodiment, the first portion may be capable of quarantining the unwanted electronic mail messages, applying policies to the electronic mail messages, scanning the electronic mail messages for viruses, archiving the electronic mail messages.

In one embodiment, the electronic mail messages may be downloaded into a first folder of the first portion. In use, the electronic mail messages may be delivered to the electronic mail message manager from a second folder of the second portion. Still yet, the second folder of the second portion may be periodically synchronized with the first folder of the first portion.

As an option, the first portion may include a plurality of agents for downloading the electronic mail messages utilizing a plurality of protocols. The first portion may subsequently normalize the electronic mail messages for processing purposes. Further, the second portion may include a plurality of server components for delivering the electronic mail messages to the electronic mail message manager utilizing the plurality of protocols.

In a related optional installation process, the electronic mail message manager may be automatically equipped with the second address upon the installation of the anti-spam system.

Another system, system, method and computer program product are provided for filtering unwanted electronic mail messages. Initially, electronic mail messages are retrieved utilizing a plurality of protocols. The electronic mail messages are then normalized. The normalized electronic mail messages are subsequently processed.

Such processed electronic mail messages are then capable of being retrieved utilizing the plurality of protocols.

In one aspect of the present embodiment, the processing may include filtering the electronic mail messages that are unwanted.

BRIEF DESCRIPTION OF THE DRAWINGS

Prior Art

DESCRIPTION OF THE PREFERRED EMBODIMENTS

Figure 1:
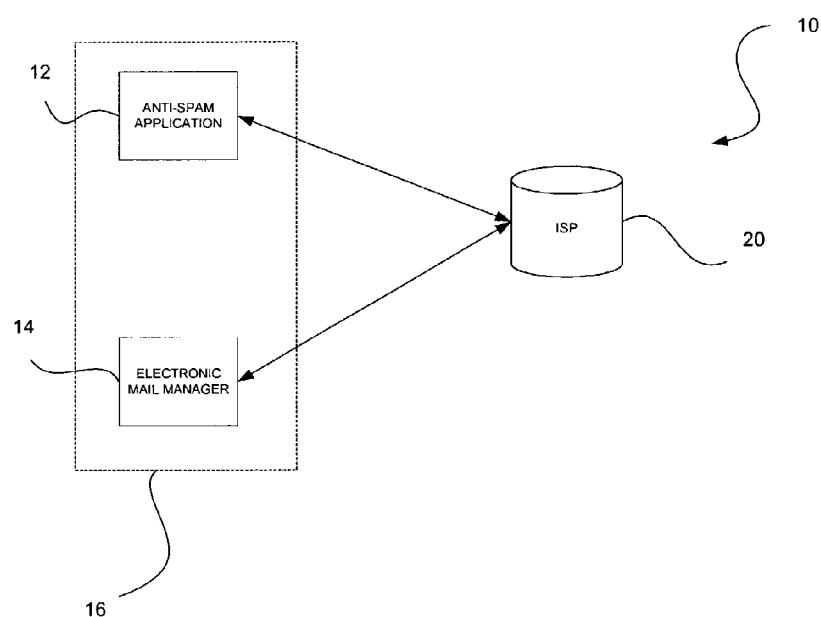
FIG. 1 illustrates one exemplary prior art system.
Figure 1A:
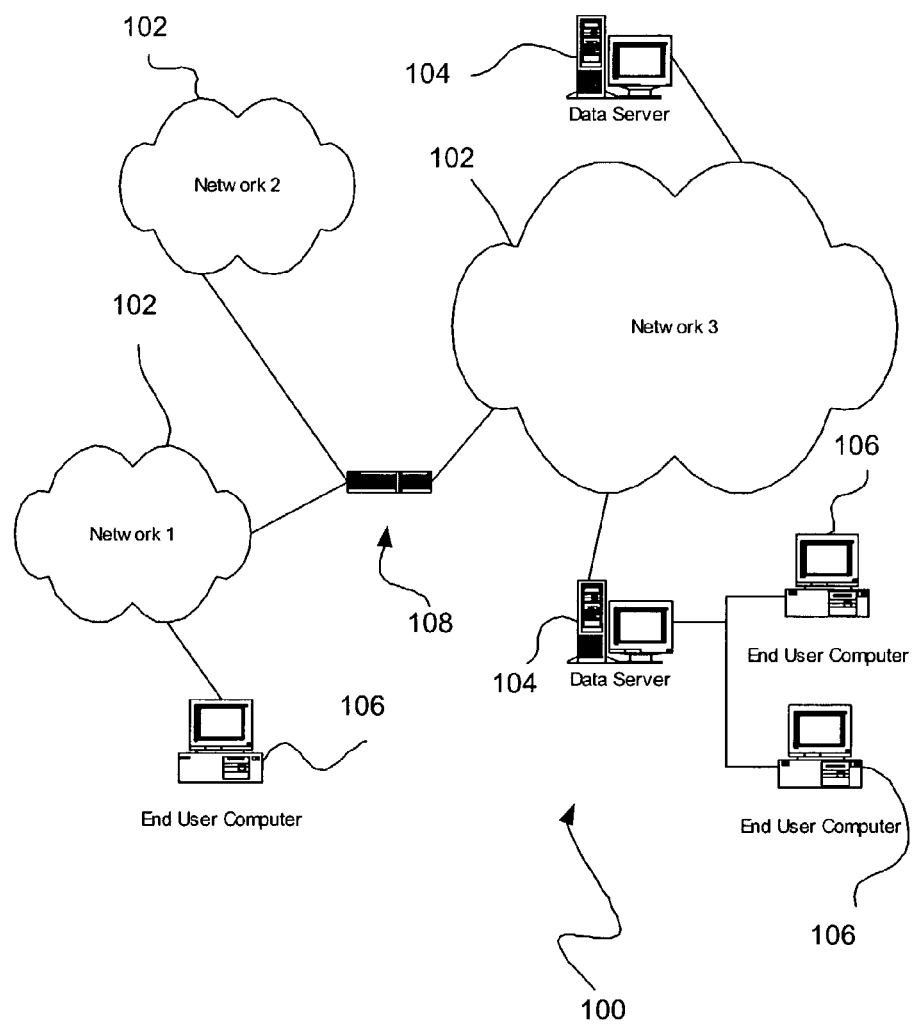
FIG. 1A illustrates a network architecture, in accordance with one embodiment.

FIG. 1A illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween. It should be noted that each of the foregoing network devices as well as any other unillustrated devices may be interconnected by way of a plurality of network segments.

Figure 2:
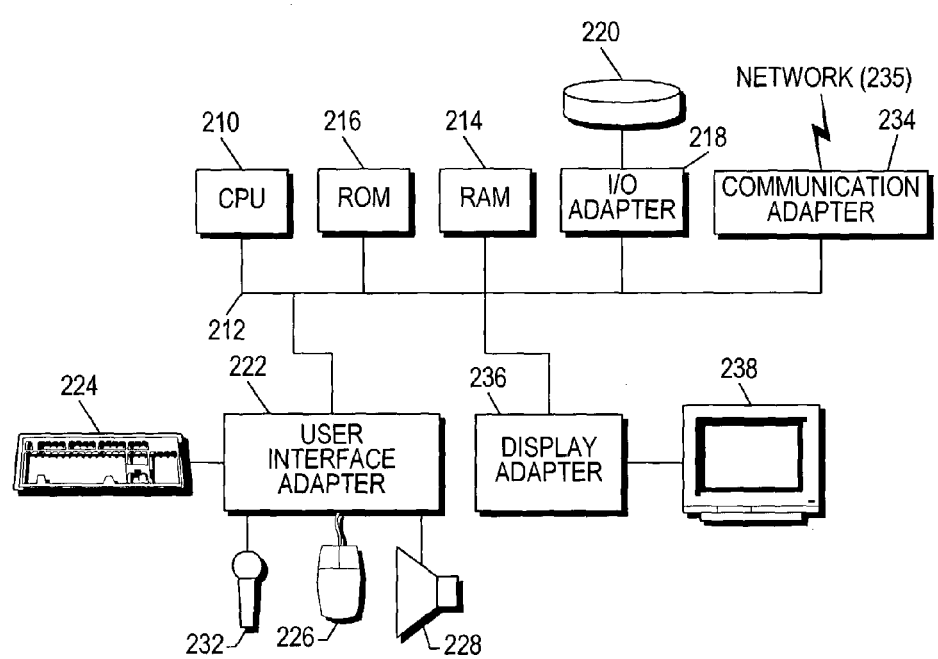
FIG. 2 shows a representative hardware environment that may be associated with the data server computers and/or end user computers of FIG. 1A, in accordance with one embodiment.

FIG. 2 shows a representative hardware environment that may be associated with the data server computers 104 and/or end user computers 106 of FIG. 1A, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
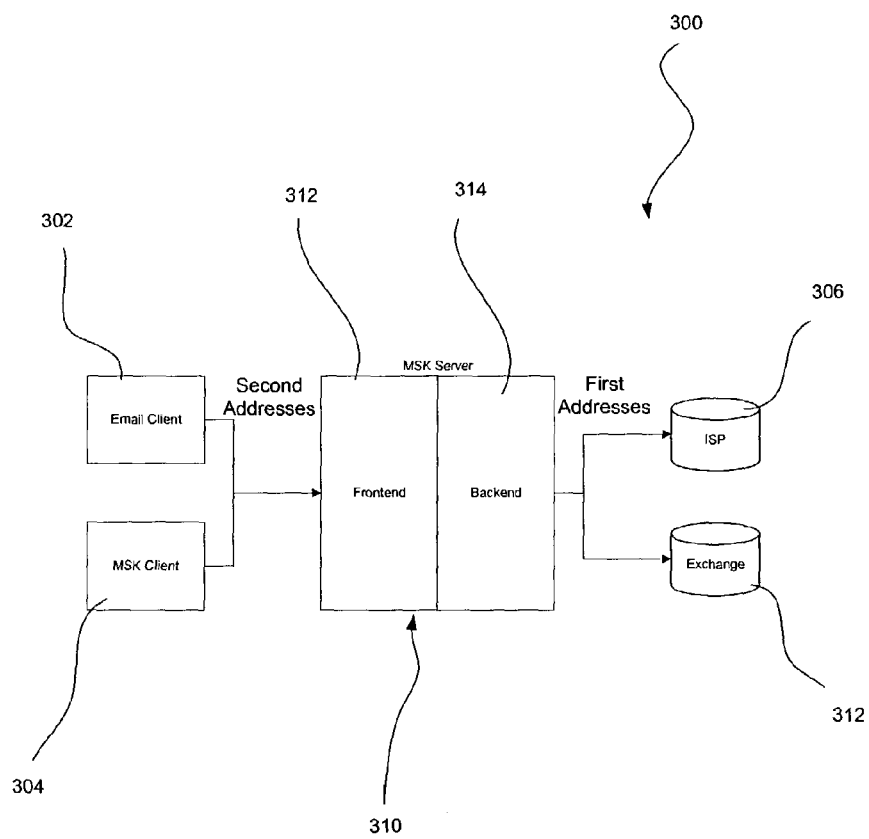
FIG. 3 illustrates a system adapted for filtering unwanted electronic mail messages, in accordance with one embodiment.

FIG. 3 illustrates a system 300 adapted for filtering unwanted electronic mail messages, in accordance with one embodiment. As an option, the present system 300 may be implemented in the context of the architecture of FIGS. 1 and 2. Of course, the system 300 may be carried out in any desired environment.

As shown, the anti-spam system 300 includes an anti-spam server 310 coupled to an Internet Service Provider (ISP) 306 and an exchange server 312 via a network. In the context of the present description, the ISP 306 may include any service provider capable of delivering electronic mail messages over the Internet. Moreover, the exchange server 312 may include any server adapted to download various information to the anti-spam server 310 for reasons that will soon become apparent.

It should be further noted that, in the present description, an electronic mail message may include any message capable of being delivered from a sending party, over a network such as the Internet, and displayed to a recipient party. Just by way of example, the electronic mail messages may take on various mail protocols such as post office protocol (POP3), simple mail transfer protocol (SMTP), America On-Line® (AOL) protocol, Yahoo® protocol, Internet Message Access Protocol (IMAP), Messaging Application Program Interface (MAPI) protocol, Microsoft® Hotmail® protocol, and/or any other protocols capable of delivering messages over the Internet.

The anti-spam server 310 is further connected to an e-mail client 302 and an anti-spam client 304. In use, the e-mail client 302 may include any electronic mail message manager capable of receiving electronic mail messages and displaying the same to a user. Moreover, the anti-spam client 304 may be capable of configuring, controlling, and/or monitoring various functionality of the anti-spam server 310.

As shown in FIG. 3, the anti-spam server 310 includes a back end 314 coupled to the exchange server 312 and the ISP 306, and a front end 312 coupled to the e-mail client 302 and the anti-spam client 304. In use, the back end 314 of the anti-spam server 310 is capable of downloading electronic mail messages via a network using a set of first addresses. Such addresses may include any address capable of downloading electronic mail messages from the ISP 306, for example. Furthermore, the first set of addresses may be associated with a variety of the aforementioned protocols. Just by way of example, the addresses may include "POP3.XYZ.COM," "MAIL.YAHOO.COM," or the like.

Once the electronic mail messages have been downloaded, the back end 314 is further capable of carrying out any desired processing involving the electronic mail messages. For example, the back end 314 may filter the electronic mail messages that are unwanted (i.e. spam). Optionally, any protocol-specific formatting or content associated with the electronic mail messages may be removed prior to the filtering, so as to "normalize" the electronic mail messages. This may facilitate the uniform application of various filtering techniques to the electronic mail messages. More information regarding some exemplary filtering techniques will be set forth in greater detail during reference to FIGS. 8 and 9.

Again, the anti-spam client 304 may be capable of configuring, controlling, and/or monitoring various filtering carried out by the anti-spam server 310. Of course, the processing may include other security-related processing, etc. More information regarding such other possible processing carried out by the back end 314 will be set forth hereinafter in greater detail.

The front end 312 is further capable of interfacing with the back end 314 of the anti-spam server 310. For example, in use, the front end 312 may be capable of storing the electronic mail messages filtered by the back end 314.

Thus, the e-mail client 302 may retrieve the electronic mail messages from the front end 312. Still yet, the e-mail client 302 may display the electronic mail messages to a user. Of course, this may be accomplished utilizing an electronic mail message manager of any type. It should be noted that the filtered electronic mail messages are retrieved from the front end 312 of the anti-spam server 310 using a set of second addresses and the plurality of protocols that were used to initially retrieve the electronic mail messages from the ISP 306. To accomplish this, any protocol-specific formatting or content associated with the electronic mail messages may be used/reinstated.

To this end, the e-mail client 302 is configured to retrieve the electronic mail messages from the anti-spam server 310 as opposed to directly retrieving the same from the ISP 306. In one embodiment, this serial design is transparent to a user. For example, the electronic mail message manager of the e-mail client 302 may be automatically equipped with the second addresses associated with the front end 312 upon the installation of the anti-spam system 300.

Figure 4:
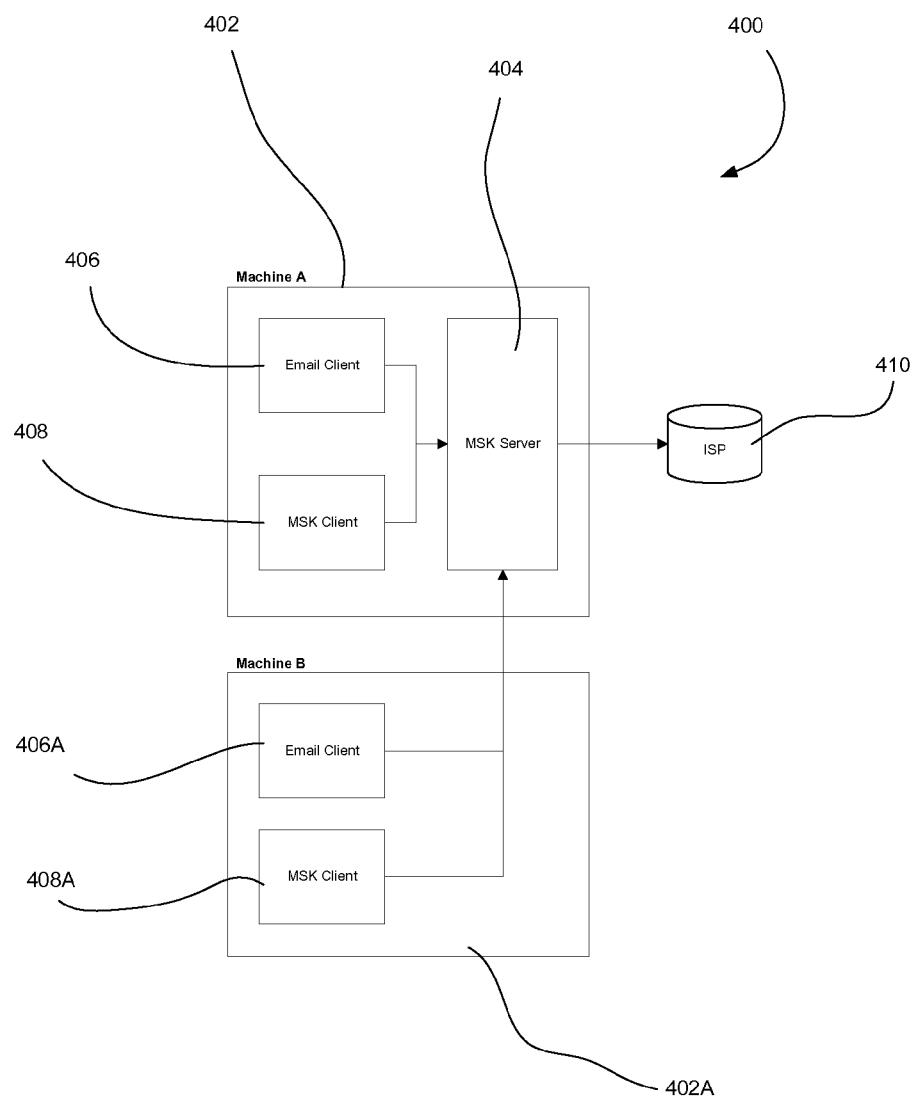
FIG. 4 illustrates a system adapted for filtering unwanted electronic mail messages involving multiple computers, in accordance with another embodiment.

FIG. 4 illustrates a system 400 adapted for filtering unwanted electronic mail messages involving multiple computers, in accordance with another embodiment. As an option, the present system 400 may be implemented in the context of the architecture of FIGS. 1 and 2 and may employ features similar to the system 300 of FIG. 3. Of course, the system 400 may be carried out in any desired environment.

The anti-spam system 400 is shown to include an anti-spam server 404 coupled to an Internet Service Provider (ISP) 410 via a network. The anti-spam server 404 is further coupled to a first e-mail client 406 and a first anti-spam client 408. Again, the first e-mail client 406 may include any electronic mail message manager capable of receiving electronic mail messages and displaying the same to a user. Moreover, the first anti-spam client 408 may be capable of configuring, controlling, and/or monitoring various functionality of the anti-spam server 404. Of course, the remaining components may operate in a manner similar to the system 300 of FIG. 3.

As shown in FIG. 4, the foregoing components are situated on a first computer 402. Further provided is a second computer 402A which is equipped with a second e-mail client 406A and a second anti-spam client 408A. In use, such second e-mail client 406A and second anti-spam client 408A are adapted to interface the anti-spam server 404 of the first computer 402.

In use, the first e-mail client 406 may be adapted to access electronic mail messages associated with a certain set of electronic mail accounts, while the second e-mail client 406A may be adapted to access electronic mail messages associated with a 5 another set of electronic mail accounts. In other words, in the context of the description FIG. 3, the first e-mail client 406 may download electronic mail messages from the anti-spam server 404 utilizing a first subset of the second set of addresses, while the second e-mail client 406A may download electronic mail messages from the anti-spam server 404 utilizing a second subset of the second set of addresses. Such subsets of the second set of addresses may be assigned based on users of the two computers 402, 402A.

Moreover, the first anti-spam client 408 may be responsible for configuring, controlling, and/or monitoring the manner in which the anti-spam server 404 processes electronic mail messages associated with the first computer 402. Similarly, the second anti-spam client 408A may be responsible for configuring, controlling, and/or monitoring the manner in which the anti-spam server 408 processes electronic mail messages associated with the second computer 402A.

In addition to the foregoing features, the e-mail and anti-spam clients may be assigned various hierarchies. For example, the first anti-spam client 408 may be designated an "administrator," while the second anti-spam client 408A may be designated as a "user." Thus, the first anti-spam client 408 may be capable of configuring, controlling, and/or monitoring the manner in which the anti-spam server 404 processes electronic mail messages associated with both computers 402, 402A.

Again, the e-mail clients 406, 406A are configured to retrieve the electronic mail messages from the anti-spam server 404 as opposed to directly retrieving the same from the ISP 410. Similar to the system 300 of FIG. 3, this serial design may be transparent to users.

Figure 5:
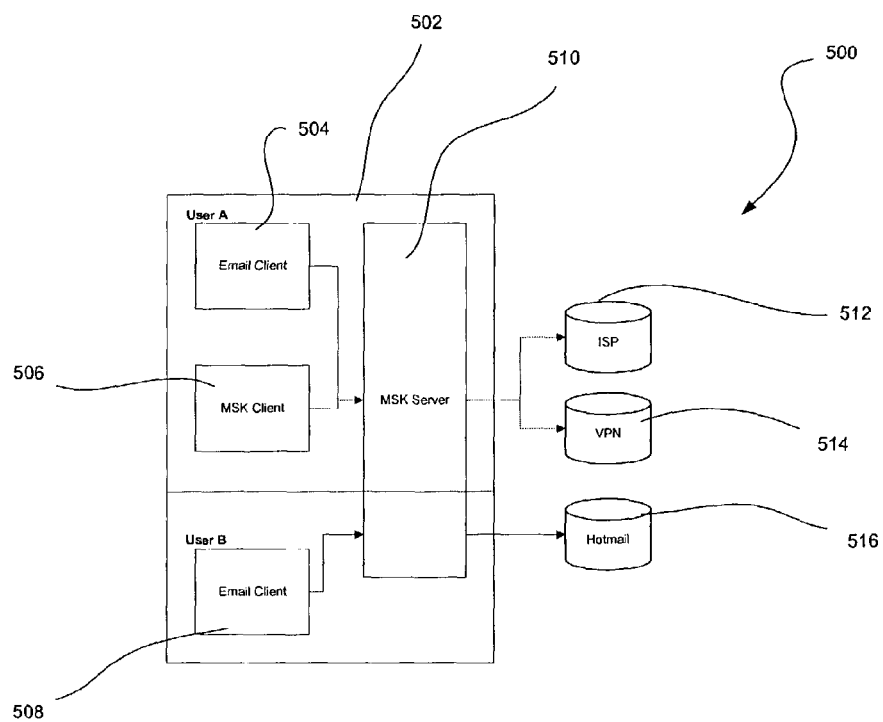
FIG. 5 illustrates a system adapted for filtering unwanted electronic mail messages involving multiple users on a single computer, in accordance with still another embodiment.

FIG. 5 illustrates a system 500 adapted for filtering unwanted electronic mail messages involving multiple users on a single computer, in accordance with still another embodiment. As an option, the present system 500 may be implemented in the context of the architecture of FIGS. 1 and 2 and may employ features similar to the system 300 of FIG. 3. Of course, the system 500 may be carried out in any desired environment.

The anti-spam system 500 is shown to include an anti-spam server 510 coupled to Internet Service Providers (ISPs) 512, 516; and other networks [i.e. virtual private network (VPN) 514, etc.] via a network. The anti-spam server 510 is further coupled to a first e-mail client 504 associated with a first user, a second e-mail client 508 associated with a second user, and an anti-spam client 506. In the present system 500, the foregoing components are all situated on a single computer 502.

Again, the e-mail clients 504, 508 may each include any electronic mail message manager capable of receiving electronic mail messages and displaying the same to a user. Specifically, in the context of the description FIG. 3, the first e-mail client 504 may download electronic mail messages from the anti-spam server 510 utilizing a first subset of the second set of addresses, while the second e-mail client 508 may download electronic mail messages from the anti-spam server 510 utilizing a second subset of the second set of addresses. Such subsets of the second set of addresses may be assigned to the two different users of the computer 502.

In use, the anti-spam client 506 may be capable of configuring, controlling, and/or monitoring various functionality of the anti-spam server 510. In particular, the anti-spam client 506 may be responsible for configuring, controlling, and/or monitoring the manner in which the anti-spam server 510 processes electronic mail messages associated with both the first e-mail client 504 and the second e-mail client 508. Of course, the remaining components may operate in a manner similar to the system 300 of FIG. 3.

Figure 6:
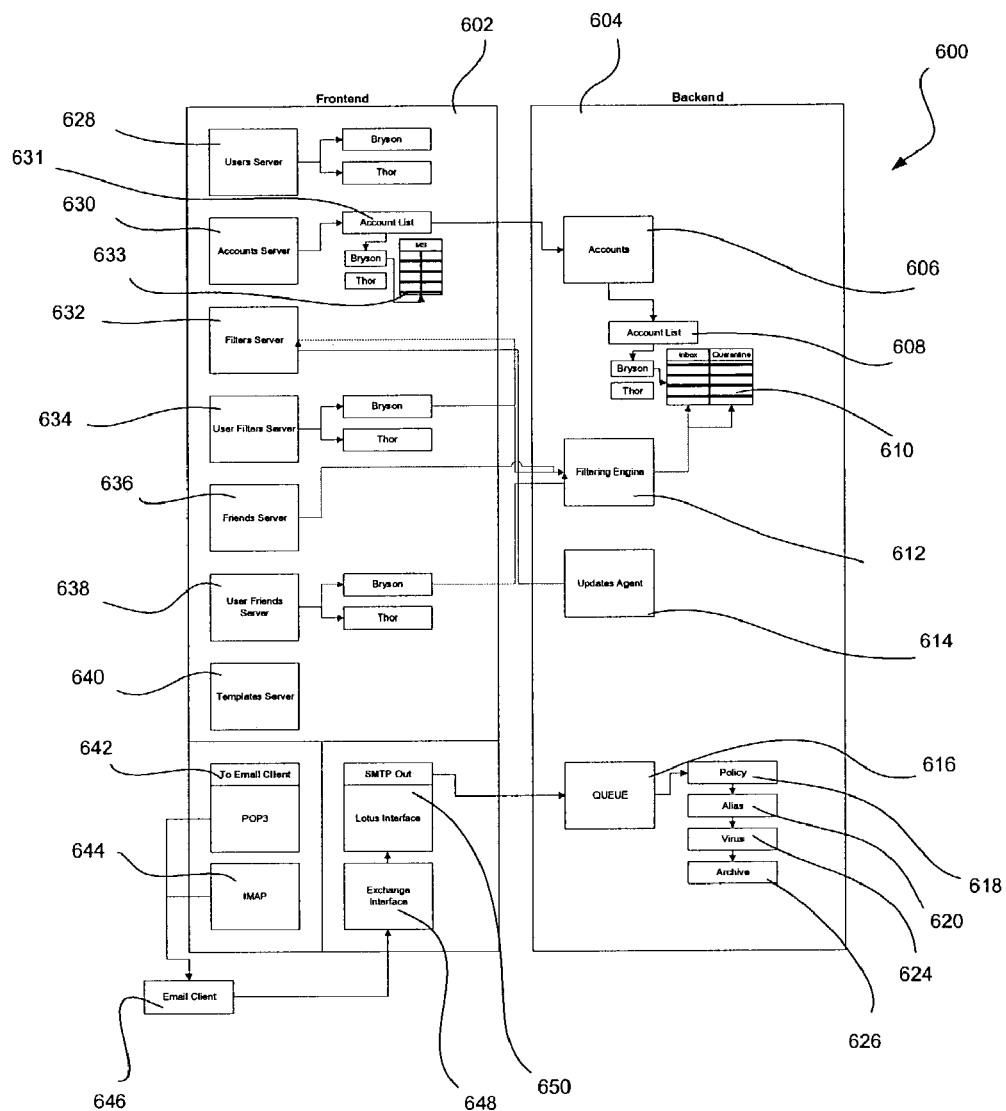
FIG. 6 illustrates an exemplary anti-spam server including a front-end and a back-end adapted for filtering unwanted electronic mail messages, in accordance with one embodiment.

FIG. 6 illustrates an exemplary anti-spam server 600 including a front-end and a back-end adapted for filtering unwanted electronic mail messages, in accordance with one embodiment. As an option, the present anti-spam server 600 may be implemented in the context of the anti-spam server 310 of FIG. 3. Of course, the anti-spam server 600 may be implemented in any desired context.

As shown in FIG. 6, the anti-spam server 600 is provided with a front end 602 and a back end 604. Together the front end 602 and back end 604 collectively download electronic mail messages via a network using a set of first addresses, filters the electronic mail messages that are unwanted, and stores the electronic mail messages filtered.

To this end, at least one client 646 coupled to the anti-spam server 600 is capable of retrieving the filtered electronic mail messages from the anti-spam server 600 using a set of second addresses. In one embodiment, the anti-spam server 600 and the at least one client 646 reside on a single computer. Of course, however, such components may be distributed as desired.

With attention first to the back end 604, included is an accounts manager 606 adapted for downloading electronic mail messages via a network using the set of first addresses. Of course, each address may be associated with various protocols each with an associated agent for performing the downloading. Moreover, such addresses are each associated with accounts stored in an account list 608 coupled to the accounts manager 606.

Upon such electronic mail messages being downloaded by the accounts manager 606, the electronic mail messages are stored in a first folder 610 coupled to the accounts manager 606 associated with the back end 604. As shown, the first folder 610 includes an inbox portion for storing the incoming electronic mail messages and a quarantine portion for storing any electronic mail messages in the manner that will soon be set forth. As set forth hereinabove, the electronic mail messages may be normalized in the first folder 610 to facilitate the filtering.

To accomplish this filtering, a filtering engine 612 communicates with the inbox portion of the first folder 610. Such filtering may include any desired technique of identifying unwanted electronic mail messages. To ensure that the filtering engine 612 is kept up to date with the latest filtering techniques, etc.; an update module 614 is coupled thereto for receiving updates via a network. For example, such updates may be received from an exchange server such as that shown in FIG. 3. Various examples of filtering techniques will be set forth in greater detail during reference to FIGS. 8 and 9.

It should be noted that the processing carried out by the back end 604 need not be limited to anti-spam filtering. For example, a policy engine 618 may be included for applying policies to the electronic mail messages for selectively sending, deleting, quarantining, etc. the same. Still yet, an anti-virus engine 624 may be provided for scanning the electronic mail messages for viruses (i.e. malicious computer code, etc.). Even still, an archive engine 626 may be adapted for archiving the electronic mail messages. Of course, other engines (i.e. alias engine 602, etc.) may be included per the desires of the user. For outgoing electronic mail messages, a queue 616 may be included for storing such messages as the various engines 618-626 process the same in the foregoing manner.

Coupled to the back end 604 is the front end 602 of the anti-spam server 600. As shown, the front end 602 includes a users server 628 for tracking the various users associated with the various accounts stored in the account list 608 and managed by the electronic mail manager 606. For example, a first subset of the first set of addresses may be affiliated with a first user, while a second subset of the first set of addresses may be affiliated with a second user.

Further included with the front end 602 of the anti-spam server 600 is an accounts server 630 including an account list 631 similar to the account list 608 of the back end 604. As an option, each account list may be user-configured. Further coupled to the accounts server 630 is a second folder 633 similar to the first folder 610 of the back end 604. In use, the accounts server 630 is adapted to synchronize the contents of the second folder 633 with the filtered contents of the first folder 610 of the back end 604.

A global filters server 632 is coupled to the filtering engine 612 for configuring, controlling, and/or monitoring the filtering functionality of the filtering engine 612. It should be noted that the global filters server 632 acts globally (i.e. company-wide) and its control applies to all of the electronic mail messages received from each account. As shown in FIG. 6, the global filters server 632 is also coupled to the update engine 614 so as to allow it to be updated in any desired manner via the network.

Associated with the global filters server 632 is a user filters server 634 coupled to the filtering engine 612 for configuring, controlling, and/or monitoring the filtering functionality of the filtering engine 612. Unlike the global filters server 632, the user filters server 634 is adapted for configuring, controlling, and/or monitoring the filtering functionality specific to the various accounts and users defined by the users server 628 and accounts server 630. By virtue of this difference, the control administered by the user filters server 634 is subservient to the control administered by the global filters server 632. In other words, for example, the user filters server 634 can not configure and/or control the filtering functionality in a way that conflicts with the global filters server 632.

Further included is a global friends server 636 in communication with the filter engine 612. In use, the global friends server 636 tracks various white lists/black lists that apply to all of the specific accounts and users defined by the users server 628 and accounts server 630. In the context of the present description, a black list is a list of electronic mail sources that are filtered as being unwanted, and a white list is a list of electronic mail sources that are not filtered as being unwanted.

Associated with the global friends server 636 is a users friends server 638 which is also in communication with the filter engine 612. Unlike the global friends server 636, the users friends server 638 is capable of tracking various white lists/black lists that apply to only certain specific accounts and users defined by the users server 628 and accounts server 630. In other words, the white lists/black lists of the global friends server 636 are globally applied, while the white lists/black lists of the users friends server 638 are only applied to the electronic mail messages associated with the accounts of a specific user.

Still yet, a templates server 640 is provided for generating the appropriate responses to filtered electronic mail messages. For example, such responses may be sent to a source of the filtered electronic mail messages requesting that such electronic mail messages no longer be sent.

With continuing reference to FIG. 6, the front end 602 is shown to further include various e-mail server components 642, 644 for receiving requests from one or more e-mail clients 646 (i.e. electronic mail message managers, etc.) to receive the electronic mail messages. Of course, server components 642, 644 may be provided for each of a plurality of protocols that are to be supported by the anti-spam server 600. As noted above, each of the e-mail clients 646 may utilize a subset of the second set of addresses, which the front end 602 is capable of differentiating on a user-by-user basis.

Conversely, a plurality of outgoing mail servers 648, 650 may be provided for sending electronic mail messages from the e-mail clients 646 to recipients via the network. It should be noted that the queue 616 may be used to process such outgoing electronic mail messages using the various engines 616-626 in the manner set forth hereinabove.

Optionally, the e-mail clients 646 can access their killed mail list, server inbox, personalized filters and personalized friend list. The client 646 may also be able add, remove and edit e-mail accounts. Still yet, a user-interface may be provided in conjunction with any electronic mail manager. For example, three simple buttons may be integrated into a horizontal tool bar during installation. Such buttons may give the user access to basic functions such as "Block," "Add Friend" and "View Quarantine."

As yet another option, various reporting engines may be integrated into the present architecture. Three exemplary types of reporting may be supported: 1) application reporting to the user, 2) spam reporting to a central server, and 3) application reporting to the center server. Table 1 illustrates more information regarding such reporting features.

Table 1

1. Application reporting to the user may simply report statistics regarding volume and categorical breakdown of spam email for all accounts and by account. This may be displayed to the end user on a summary screen through the use of tables and graphs.
2. Spam reporting to central server may enable a user to report a spam back to the central server that slipped through the filters.
3. Application reporting to the central server may take the data from 1), on an opt-in basis and report it back to the central server according to a predefined schedule. This may provide insight into spam trends around the world which would be valuable data for the press, ISPs, and analysts.

It should be noted that the communications shown between the front end 602 and the back end 604 of the anti-spam system 600 may be carried out during a synchronization process. In one embodiment, such synchronization may be executed periodically or even manually per the desires of the user. For example, the electronic mail messages of the first folder 610 and the second folder 633 may be carried out periodically, and manually upon the receipt of an urgent or redundant user request via an electronic mail message manager.

By this design, the electronic mail messages are filtered prior to them being delivered to the e-mail client. This serial design thus overcomes many of the difficulties of the prior art.

Figure 7:
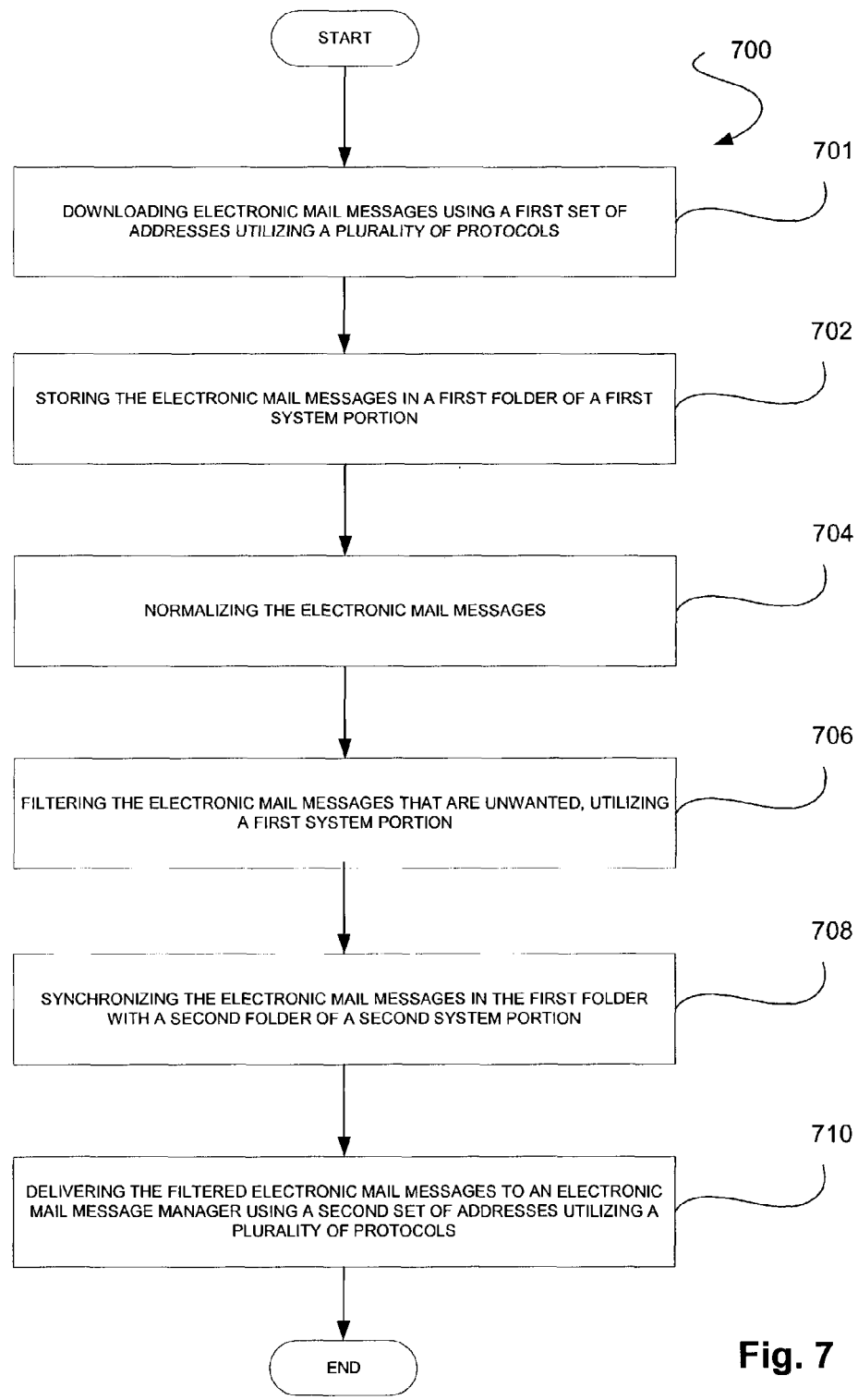
FIG. 7 illustrates a method for filtering unwanted electronic mail messages, in accordance with one embodiment.

FIG. 7 illustrates a method 700 for filtering unwanted electronic mail messages, in accordance with one embodiment. As an option, the present method 700 may be implemented in the context of the anti-spam server 310 of FIG. 3 or the remaining figures. Of course, the method 700 may be implemented in any desired context.

As shown in operation 701, electronic mail messages are downloaded to a computer via a network. This is accomplished using a first set of addresses utilizing a plurality of protocols. Next, such electronic mail messages are stored in a first folder of a first system portion (i.e. a back end). Note operation 702.

To facilitate future processing, the electronic mail messages are normalized in operation 704. Such normalization may remove various formatting specific to the protocols associated with the electronic mail messages.

Next, in operation 706, the electronic mail messages are processed. Specifically, among other processing, the electronic mail messages that are unwanted are filtered. This is accomplished utilizing the first system portion.

In operation 708, the electronic mail messages in the first folder are synchronized with a second folder of a second system portion (i.e. a front end). The filtered electronic mail messages are then ready to be delivered to an electronic mail message manager using a second set of addresses utilizing a plurality of protocols. Note operation 710.

Figure 8:
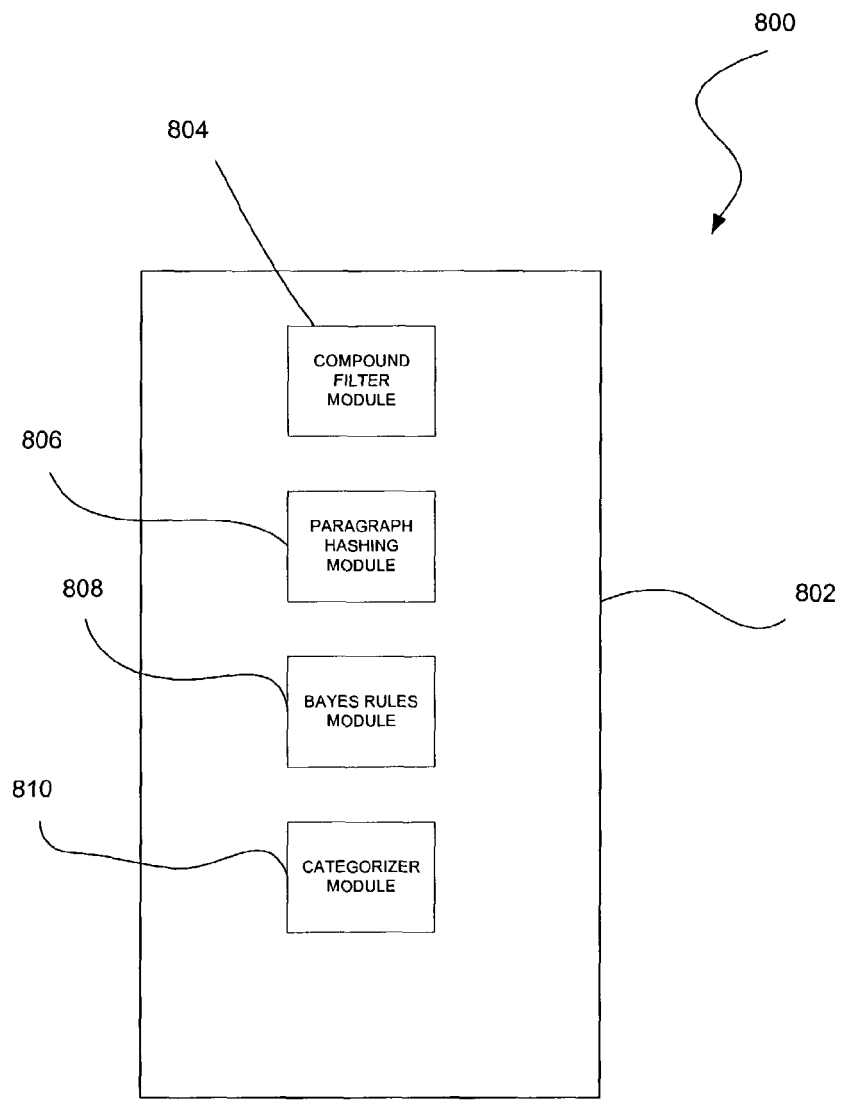
FIG. 8 illustrates a system for filtering unwanted electronic mail messages, in accordance with one embodiment.

FIG. 8 illustrates a system 800 for filtering unwanted electronic mail messages, in accordance with one embodiment. Optionally, the present system 800 may be implemented in the context of the anti-spam server 310 of FIG. 3 and, in particular, the filtering engine 612 of FIG. 6. Of course, however, the system 800 may be implemented in any desired context.

As shown, the system 800 includes a suite of modules 802 including a compound filter module 804, a paragraph hashing module 806, a Bayes rules module 808, and a categorizer module 810. In use, the various modules 802 may work in any desired combination.

For example, after receiving electronic mail messages, the electronic mail messages that are unwanted are filtered utilizing a combination of techniques including: compound filters, paragraph hashing, and Bayes rules; by employing the foregoing modules 802. The electronic mail messages that are filtered as being unwanted are then categorized using the categorizer module 810. Following is an exemplary description of the various functionality employed by the modules 802 in filtering unwanted electronic mail messages.

The compound filter module 804 may, in one embodiment, employ a plurality of filters to received electronic mail messages. For example, one filter may specify that any electronic mail message received from a predetermined IP address is filtered. Further, the compound filter module 804 may employ Boolean logic to accomplish compound filtering. For instance, in the context of the previous example, the electronic mail message may be filtered when it is received from the predetermined IP address "AND" it specifies specific text in the subject header thereof. Of course, any desired operators (i.e. "OR," "AND," "NOT," etc.) may be employed.

Further, the compound filter module 804 may utilize conditional logic (i.e. "if..then..else", etc.) to accomplish desired filtering. For example, again in the context of the previous example, the filter may specify that if the foregoing AND Boolean logic is met, then the electronic message is deleted, else a simple quarantine operation is executed.

Optionally, the compound filters may each have a level associated therewith. Thus, the compound filters having a higher level associated therewith may be applied to the electronic mail messages prior to the compound filters having a lower level associated therewith. More information regarding such aspect will be set forth in greater detail during reference to FIG. 9.

With attention now to the paragraph hashing module 806, various paragraphs of content of the electronic mail messages may be hashed in order to identify content previously found in known spam. In particular, the electronic mail messages may be filtered as being unwanted upon results of the paragraph hashing matching that of known unwanted electronic mail messages. This may be accomplished utilizing a database of hashes of paragraphs known to exist in previously filtered/identified spam.

As an option, the paragraph hashing may utilize an MD5 algorithm. MD5 is an algorithm that is used to verify data integrity through the creation of a 128-bit message digest from data input (which may be a message of any length) that is claimed to be as unique to that specific data as a fingerprint is to a specific individual.

To facilitate this process, content of the electronic mail messages may be normalized prior to utilizing the paragraph hashing. Such normalizing may include removing punctuation of the content, normalizing a font of the content, and/or normalizing a case of the content.

As a further option, the paragraph hashing may exclude a first and last paragraph of content of the electronic mail messages, as spammers often alter such paragraphs to avoid filtering by paragraph hashing.

Similar to the compound filters of the compound filter module 804, the hashes of known unwanted electronic mail messages may each have a level associated therewith. Thus, the hashes having a higher level associated therewith may be applied to the electronic mail messages prior to the hashes having a lower level associated therewith.

The Bayes rules module 808 may involve the use of a Bayes rules database indicating a probability associated with each of a multiplicity of words and/or group of words, where the probability reflects the probability that the associated words and/or group of words represent spam. Of course, the Bayes rules may be employed in any desired manner. For example, see U.S. Pat. No. 6,161,130, which is incorporated herein by reference.

In use, the Bayes rules module 808 identifies words and/or groups of words in the content of the electronic mail messages. Next, a probability associated with each of the words and/or groups of words is determined using the Bayes rules database. Thus, during use of the present embodiment, the electronic mail messages may be filtered as being unwanted based on a comparison involving the probability and a threshold. As an option, the threshold is user-defined.

Finally, the categorizer module 810 may be used such that the electronic mail messages that are filtered as being unwanted may be categorized in a plurality of categories. Such categories may include pornographic, violent, language, etc. This may be accomplished in any desired manner. For example, a keyword index or look-up table may be used to determine in which category any particular electronic message belongs.

It should be noted that the foregoing modules may be easily updated by a user. For example; upon an electronic message being identified as spam by a user, a compound filter, a paragraph hashing, and Bayes rules probability may be generated and added to the existing functionality.

Figure 9:
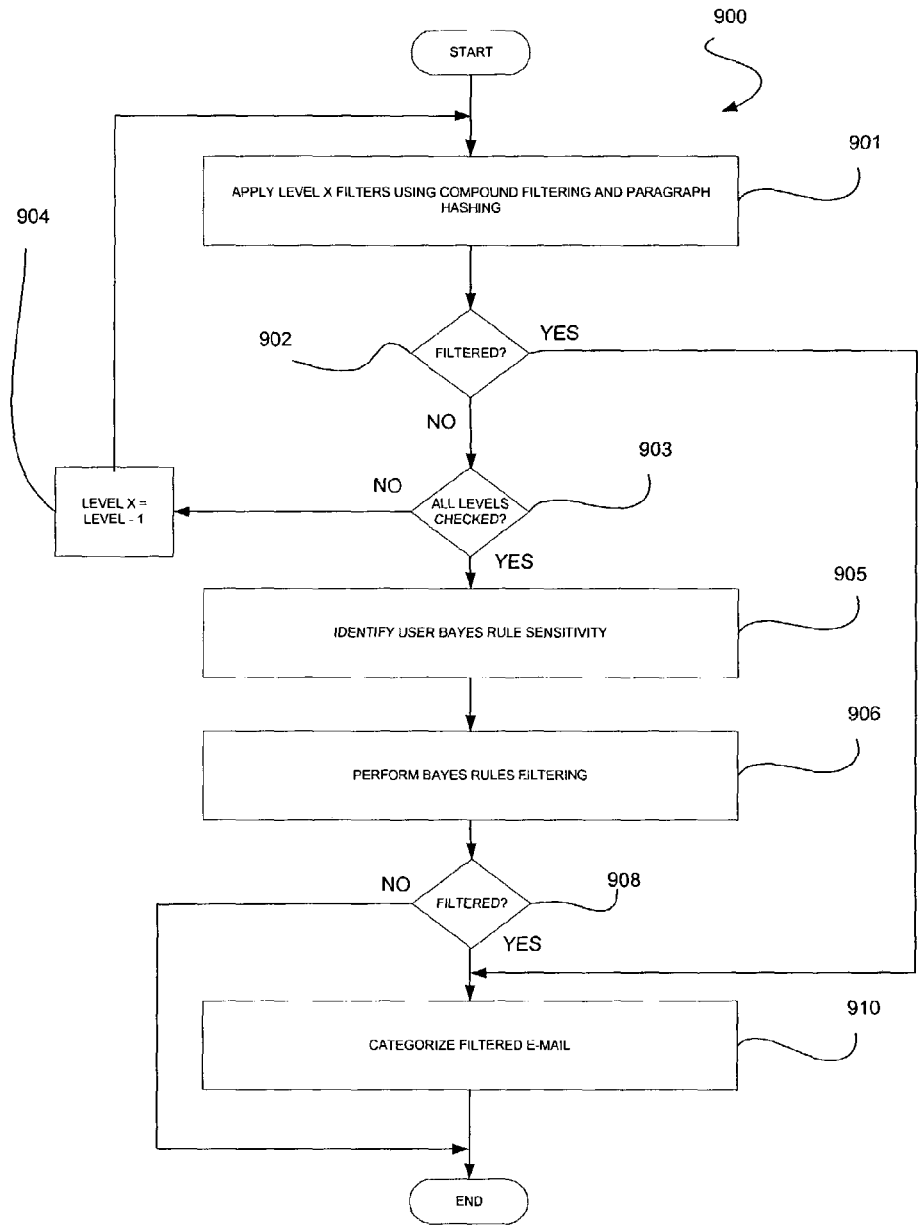
FIG. 9 illustrates a method for filtering unwanted electronic mail messages, in accordance with one embodiment.

FIG. 9 illustrates a method 900 for filtering unwanted electronic mail messages, in accordance with one embodiment. Optionally, the present method 900 may be implemented in the context of the anti-spam server 310 of FIG. 3 and, in particular, the filtering engine 612 of FIG. 6. Still yet, the present method 900 may utilize the various modules 802 of the system 800 of FIG. 8. Of course, however, the present method 900 may be implemented in any desired context.

As shown, in operation 901, a first level of compound filters and paragraph hashing may be applied to each electronic mail message to filter the electronic mail messages that are unwanted. As mentioned earlier during reference to FIG. 8, each compound filter and paragraph hashing may be assigned a level for reasons that will soon become apparent. Optionally, such compound filters and paragraph hashing may be carried out by the compound filter module 804 and paragraph hashing module 806 of FIG. 8, respectively. Of course, any desired techniques may be used to carry out such filtering.

It is then determined in decision 902 as to whether the electronic mail message has been filtered as being unwanted. If not, it is then determined whether all applicable levels of the compound filters and the paragraph hashing have been applied. Note decision 903. If further levels of the compound filters and the paragraph hashing remain, the level is incrementally adjusted in operation 904.

Operation 901 is then re-executed, this time applying a lower level of compound filters and paragraph hashing to the electronic mail message. By this design, the filtering techniques having a higher level associated therewith may be applied to the electronic mail messages prior to the filtering techniques having a lower level associated therewith. This sequencing provides for greater efficiency, and further allows a vendor to give priority to certain techniques (i.e. by assigning it as having a higher level). As an option, such vendor may exclusively reserve use of the highest level.

In any case, the operations 901-904 are repeated until all of the levels of filtering techniques have been applied or the electronic mail message has been filtered. If all the applicable levels of filtering techniques have been applied and the electronic mail message has still not been filtered, Bayes rules may then be applied. Again, this may be accomplished utilizing the Bayes rules module 808 of FIG. 8, or any other desired related logic.

In particular, a user-defined Bayes rule threshold is initially identified in operation 905. Such user-defined Bayes rule threshold may be set by a slider icon or any other desired user input mechanism. Moreover, the Bayes rule threshold may reflect a minimal probability amount that an electronic mail message must have before being filtered.

Bayes rules may then be used to filter the electronic mail messages that are unwanted based on the user-defined Bayes rule threshold, as indicated by operation 906. Thus, if any of the electronic mail messages have been filtered as being unwanted (see both decision 902 and 908), the filtered electronic mail message may be categorized utilizing a categorizer module 810 of FIG. 8, or similar logic. See operation 910.

A multifaceted filtering approach is thus provided including three primary filtering layers in addition to several personalized processes as well as pluggable options. Core filtering may go through a compound filter layer, a paragraph hashing filter layer and a set of Bayes rules installed with the product. The user may further be able to add personal filters to the compound layer (by using a filter wizard) and to the paragraph hashing layer (through the use of a one-click block mechanism). The Bayes rules module may allow the user to train the core rules based upon the spam and the legitimate email that they receive. If a spam e-mail gets through the existing filter set (all three layers), the user may be able to train the Bayes rules to identify the spam email in the future. This may be accomplished through the one-click block mechanism. When a user rescues a legitimate message that was mistakenly quarantined, they may also train the Bayes rules. As such, the present embodiment may allow for the filtering engine to learn from the user's individual email, making it more accurate.

A fourth layer within the filtering process acts to classify spam mail into predefined categories once it has been determined to be spam. The categorization may take place through the use of word sets that can be updated as required.

Priorities within the filters may allow the present embodiment to add a sliding scale filtering level user interface to the installation process (also available from within a summary screen and options menu). Furthermore, filters that have the highest priority may be considered security filters. A security filter may filter all mail within the user's account, including email that they receive from individuals on their friends list. Security filters may look for known scams, identity theft spam and may also help block malicious email worms.

Still yet, filter updates may be externalized in a fashion that will enable users to download only relevant filters. For example, a user in Japan may be able to download standard English filters, Japanese-language filters and MSN-requested filters, while a user who bought the product off the shelves in the United States would only receive the standard filters.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium having a computer readable program code embodied therein, the computer readable program code adapted to be executed to implement a method, performed by a server computer comprising a first system portion and a second system portion, wherein the first system portion comprises a backend server portion and the second system portion comprises a frontend server portion, the method comprising:

downloading, by the first system portion, a plurality of electronic mail messages from a plurality of Internet Service Providers (ISPs) utilizing a plurality of different protocols comprising two or more of post office protocol (POP3), Internet message access protocol (IMAP), and a proprietary protocol to the server computer via a network using a first address;
   storing the plurality of electronic messages in a folder of the first system portion;
   normalizing, by the first system portion, the plurality of electronic mail messages;
   filtering, by the first system portion, the normalized electronic mail messages that are determined to be unwanted utilizing a filter engine of the first system portion, wherein the filter engine is configured by synchronizing the filter engine of the first system portion with settings included in the second system portion;
   synchronizing a folder of the second system portion with the folder of the first system portion, wherein the electronic messages corresponding to the filtered normalized electronic mail messages are not transferred from the folder of the first system portion to the folder of the second system portion; and
   delivering, by the second system portion, the filtered electronic mail messages to an electronic mail message manager using a second address.

2. A method performed by a server computer comprising a first system portion and a second system portion, wherein the first system portion comprises a backend server portion and the second system portion comprises a frontend server portion, the method comprising:

downloading, by the first system portion, a plurality of electronic mail messages from a plurality of Internet Service Providers (ISPs) utilizing a plurality of different protocols comprising two or more of post office protocol (POP3), Internet message access protocol (IMAP), and a proprietary protocol to the server computer via a network using a first address;
   storing the plurality of electronic messages in a folder of the first system portion;
   normalizing, by the first system portion, the plurality of electronic mail messages;
   filtering, by the first system portion, the electronic mail messages that are unwanted, utilizing a filter engine of a first system portion, the filter engine analyzing the normalized electronic mail messages;
   configuring the filter engine by synchronizing the first system portion with a second system portion, wherein the second system portion includes a configuration setting for the filter engine, the configuration setting provided to the filter engine via synchronization; and
   synchronizing the filtered electronic mail messages from the first system portion to an electronic mail message manager using a second address, utilizing a second system portion, wherein the electronic messages corresponding to the filtered normalized electronic mail messages are not delivered from the first system portion to the second system portion.

3. A non-transitory programmable storage device having programmed instructions stored thereon for causing a programmable control device to perform a method according to claim 2.

4. A method for filtering unwanted electronic mail messages, the method performed by a server computer comprising a first system portion and a second system portion, wherein the first system portion comprises a backend server portion and the second system portion comprises a frontend server portion, the method comprising:

retrieving, by the first system portion, a plurality of electronic mail messages from a plurality of Internet Service Providers (ISPs) utilizing a plurality of different protocols comprising two or more of post office protocol (POP3), Internet message access protocol (IMAP), and a proprietary protocol;
   normalizing the plurality of electronic mail messages by removing formatting specific to a protocol from the plurality of different protocols associated with each electronic mail message;
   processing the normalized electronic mail messages by the first system portion to determine which of the normalized electronic mail messages are unwanted utilizing a filter engine, the filter engine configured with settings synchronized from the second system portion; and
   synchronizing the second system portion with electronic messages from the first system portion without transferring electronic messages corresponding to the normalized electronic mail messages determined to be unwanted;
   wherein the processed electronic mail messages are capable of being retrieved utilizing the plurality of different protocols.

5. A non-transitory programmable storage device having programmed instructions stored thereon for causing a programmable control device to perform a method according to claim 4.

6. A method for filtering unwanted electronic mail messages performed by a server computer comprising a first system portion and a second system portion, wherein the first system portion comprises a backend server portion and the second system portion comprises a frontend server portion, the method comprising:

- receiving, at the first system portion, a plurality of electronic mail messages;
- configuring a filter engine of the first system portion by synchronizing the first system portion with the second system portion, wherein the second system portion includes a configuration setting for the filter engine;
- filtering electronic mail messages that are unwanted from the plurality of electronic mail messages utilizing:
- virus scanning,
- hashing, and
- compound filtering based on an IP address, and specific text in subject headers,
- wherein:
  - the plurality of electronic mail messages are filtered as being unwanted based on a comparison involving a probability that the electronic mail messages are unwanted and an associated user-defined threshold,
  - filters are updated via a download, and
  - a user is capable of adding personal filters utilizing a filter wizard;
- categorizing filtered electronic mail messages as being unwanted; and
- synchronizing the second system portion with electronic messages from the first system portion without transferring electronic messages corresponding to the electronic mail messages determined to be unwanted;
- wherein the filter engine of the first system portion is utilized for the filtering of the electronic mail messages that are unwanted.

7. A non-transitory programmable storage device having programmed instructions stored thereon for causing a programmable control device to perform a method according to claim 6.

8. A method performed by a server computer comprising a first system portion and a second system portion, wherein the first system portion comprises a backend server portion and the second system portion comprises a frontend server portion, the method comprising:

- downloading, by the first system portion, a plurality of electronic mail messages from a plurality of Internet Service Providers (ISPs) utilizing a plurality of different protocols comprising two or more of post office protocol (POP3), Internet message access protocol (IMAP), and a proprietary protocol to the server computer via a network using a plurality of first addresses;
- storing the plurality of electronic messages in a folder of the first system portion;
- normalizing, by a first system portion, the plurality of electronic messages;
- filtering the plurality of electronic mail messages that are unwanted, utilizing the first system portion, wherein the first system portion includes an account list having the plurality of first addresses for downloading the electronic mail messages;
- configuring the account list by synchronizing the first system portion with a second system portion, wherein the second system portion includes a configuration setting provided to the first system portion via synchronization; and
- synchronizing, between the first system portion and the second system portion, remaining wanted electronic mail messages from the first system portion to an electronic mail message manager using a second address.

9. A non-transitory programmable storage device having programmed instructions stored thereon for causing a programmable control device to perform a method according to claim 8.

10. A computer program product embodied on a non-transitory computer readable medium having a computer readable program code embodied therein, the computer readable program code adapted to be executed on a server computer to implement a method, the server computer comprising a first system portion and a second system portion, wherein the first system portion comprises a backend server portion and the second system portion comprises a frontend server portion, the method comprising:

- downloading, by a first system portion, a plurality of electronic mail messages from a plurality of Internet Service Providers (ISPs) utilizing a plurality of different protocols comprising two or more of post office protocol (POP3), Internet message access protocol (IMAP), and a proprietary protocol to the server computer via a network using a first address;
- normalizing, by the first system portion, the plurality of electronic mail messages;
- filtering electronic mail messages from the plurality of electronic mail messages by identifying unwanted normalized electronic mail messages, the filtering utilizing a filter portion of the first system portion configured with a setting obtained from a second system portion via synchronization;
- synchronizing, between the first system portion and the second system portion, remaining wanted electronic mail messages to an electronic mail message manager using a second address;
- wherein the first system portion that is utilized for the downloading and the second system portion that is utilized for the delivering reside on the server computer;
- wherein the first system portion is operable such that the electronic mail messages are downloaded into a first folder of the first system portion;
- wherein the second system portion is operable such that the electronic mail messages are delivered to the electronic mail message manager from a second folder of the second system portion;
- wherein the second folder of the second system portion is periodically synchronized with the first folder of the first system portion.

11. A method performed by a server computer comprising a first system portion and a second system portion, wherein the first system portion comprises a backend server portion and the second system portion comprises a frontend server portion, the method comprising:

- downloading electronic mail messages from a plurality of Internet Service Providers (ISPs) utilizing a plurality of different protocols comprising two or more of post office protocol (POP3), Internet message access protocol (IMAP), and a proprietary protocol to a computer via a network using a first address, and filtering the electronic mail messages that are unwanted utilizing a filter engine of the first system portion; and
- synchronizing, between the first system portion and the second system portion, the filtered electronic mail messages from the first system portion to an electronic mail message manager using a second address, utilizing an electronic mail message manager of the second system portion;
- wherein the first system portion and the second system portion reside on the computer;

wherein the first system portion is capable of downloading electronic mail messages from a first ISP utilizing a first protocol, downloading electronic mail messages from a second ISP utilizing a second protocol, and downloading electronic mail messages from a third ISP utilizing a third protocol;

wherein the electronic mail messages are downloaded into a first folder of the first system portion;

wherein the electronic mail messages are delivered to the electronic mail message manager from a second folder of the second system portion;

wherein the second folder of the second system portion is periodically synchronized with the first folder of the first system portion; and wherein the filter engine of the first system portion is configured via synchronization with a setting from the second system portion.

12. A non-transitory programmable storage device having programmed instructions stored thereon for causing a programmable control device to perform a method according to claim 11.

* * * * *